Dec. 2, 1958 W. R. KOCH 2,863,123

TRANSISTOR CONTROL CIRCUIT

Filed Nov. 8, 1954 2 Sheets-Sheet 1

INVENTOR.
WINFIELD R. KOCH

BY [signature]

ATTORNEY

TRANSISTOR CONTROL CIRCUIT

Filed Nov. 8, 1954 2 Sheets-Sheet 2

INVENTOR.
WINFIELD R. KOCH

BY H. D. Newton

ATTORNEY 2,863,123

TRANSISTOR CONTROL CIRCUIT

Winfield R. Koch, Burlington, N. J., assignor to Radio Corporation of America, a corporation of Delaware Application November 8, 1954, Serial No. 467,373
13 Claims. (Cl. 332—31)

The present invention relates generally to electronic control circuits and particularly to electronic control circuits for effectively controlling signal translation in electronic signal conveying systems.

It is desirable to provide electronically controllable circuits to effectively control signal switching or signal translation through signal conveying networks to facilitate automatic or remote control thereof. Known circuits, however, have been found to introduce an inordinate amount of distortion through concomitant changes in direct voltage in the controlled circuit. This situation, which results primarily in transient distortion, is particularly aggravated when a relatively large network variation is effected to provide an appreciable change in the network signal translating characteristics. It has been found that the primary cause of distortion in such electronically controllable circuits has been due to the unbalanced nature of the circuit, and, therefore, an impedance change in the circuit results in an attendant change in the direct voltage level at the control point.

In the past, it has been found that there are essentially two basic methods which may be utilized to provide the function of electronic signal control. The first of these methods is the use of a controllable shunt element in a signal translating path which may be utilized to vary the impedance across the path. The second of these is the use of a controllable series element which may be effectively varied to alter the series impedance and thus vary the signal translating efficiency of the path by inserting a controllable loss.

It is accordingly an object of the present invention to provide an improved electronic control circuit enabling efficient substantially distortionless signal translation therethrough.

It is another object of the present invention to provide an electronic control circuit employing semiconductor devices and enabling a wide range in variable signal translating characteristics.

It is a further object of the present invention to provide an electronic control circuit employing semiconductor devices of opposite conductivity types to enable a wide range of control of the shunt impedance in a signal conveying network.

It is a still further object of the present invention to provide an electronic control circuit employing semiconductor devices of opposite conductivity types to enable a wide range of control of the series impedance in a signal conveying network.

In accordance with one aspect of the present invention, a pair of semiconductor devices of opposite conductivity types are connected in parallel across a signal conveying network. A push-pull control signal is applied to the devices to effectively control the impedance of each of the devices whereby the shunt impedance offered by the devices to the circuit may be appreciably altered without a variation in the direct voltage across the circuit.

In accordance with a further aspect of the present invention, a pair of semiconductor devices of opposite conductivity types are connected to provide parallel signal translating paths in series with a signal conveying network. Control signals are applied in push-pull relation to the devices to provide an impedance variation in the same sense in each of the devices. The net series impedance offered by the devices in the signal translating path is therefore variable without altering the direct current voltages in the path.

It may therefore readily be seen that effective control may be had with either of the two above described embodiments either alone or in combination without attendant transient distortion usually introduced by such circuits.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
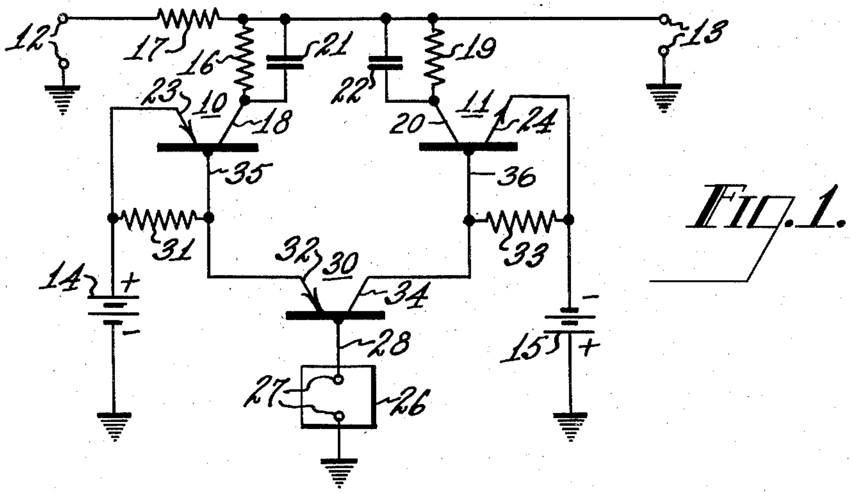
Figure 1 is a schematic circuit diagram of an electronic control circuit connected in shunt relation in a signal translating network in accordance with the present invention.

Referring now to the drawing wherein like reference characters have been used in designate like elements throughout the various figures, and particularly to Figure 1, a pair of semiconductor devices illustrated as junction transistors 10 and 11 of opposite conductivity types are arranged in parallel across a signal conveying path or network connected between a pair of input terminals 12 and a pair of output terminals 13.

The transistor 10 may be of either conductivity type and may be any semiconductor device having appropriate operating characteristics but is illustrated as a PNP junction transistor. The transistor 11 in a like manner may be of either conductivity type but must be of a conductivity type which is opposite to that of the transistor 10. It is to be noted that if the conductivity types of the transistors 10 and 11 were reversed, the polarities of the biasing batteries 14 and 15 would also have to be reversed to provide appropriate bias for the devices. It is further to be noted that any convenient source of direct current bias may be utilized to energize the devices and that the batteries 14 and 15 are shown for the purpose of illustration only.

A direct current conductive impedance element illustrated as a resistor 16 is connected in series with a direct current conductive series impedance element illustrated as a resistor 17 between one of the pair of input terminals 12 and the collector electrode 18. A second direct current conductive impedance element illustrated as a resistor 19 is connected between the collector electrode 20 and the junction of the two resistors 16 and 17. Each of the resistors 16 and 19 are bypassed for signal currents by shunt connected capacitors 21 and 22.

The emitter electrode 23 of the transistor 10 is connected to the positive terminal of the battery 14 and the emitter electrode 24 of the transistor 11 is connected to the negative terminal of the battery 15. The negative terminal of the battery 14 and the positive terminal of the battery 15 are each connected to a point of fixed reference potential such as signal ground to complete the shunt circuit for each of the two transistors 10 and 11.

A source of control voltages, which may be any convenient source of a controllable direct current signal or a controllable alternating signal, is illustrated as a rectangle 26 including a pair of control terminals 27 one of which is connected to the base electrode 28 of a semiconductor phase inverting device illustrated as a PNP junction transistor 30. The other of the pair of control terminals 27 is connected directly to signal ground. The direct current conductive load impedance elements for the transistor 30 are illustrated as a first load resistor 31 connected between the positive terminal of the battery 14 and the emitter electrode 32 and a second load resistor 33 connected between the negative terminal of the battery 15 and the collector electrode 34.

Control signals which are developed across the two load resistors 31 and 33 due to the application of a control signal to the base electrode 28 are applied respectively between the emitter electrode 23 and the base electrode 35 and the emitter electrode 24 and the base electrode 36.

The direct current path for the two transistors 10 and 11 may be traced from the positive terminal of the battery 14 through the transistor 10, the resistors 16 and 19, the transistor 11 and the battery 15 back to the negative terminal of the battery 14. The emitter-base bias of each of the transistors will determine a magnitude of this current flow and consequently the relative proportioning of the voltage drop which appears across each of the transistors 10 and 11 and each of the resistors 16 and 19.

If the bias condition is such that the transistors are operating with low collector electrode current, each will provide a relatively high voltage drop in the circuit. On the other hand, if the bias condition is such that each of the transistors is conducting heavily, that is, with a relatively high collector electrode current, each will provide a relatively low impedance and a relatively low voltage drop in the circuit.

Figure 5:
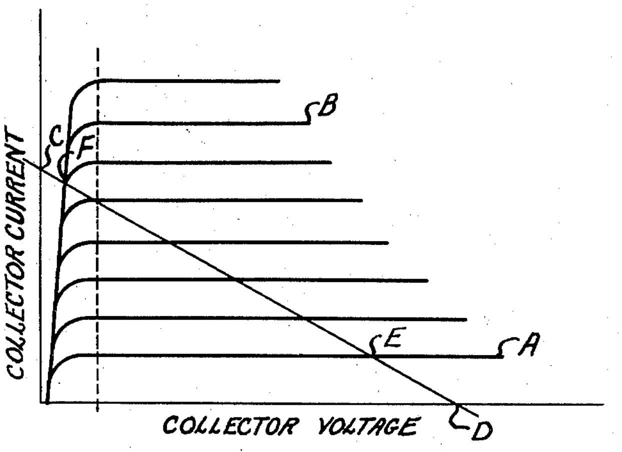
Figure 5 is a graph showing curves illustrating the collector electrode characteristics of a semiconductor device as adapted for use in the present invention.

A graphical analysis of this operation may be seen by referring to Figure 5 wherein each curve of a family of curves represents the collector electrode characteristic under different base bias conditions, for example, the curve A represents a collector electrode characteristic with a relatively small base electrode bias current which may be in the order of a few microamperes whereas the curve B may represent the collector electrode characteristic of a particular transistor with a base electrode bias of several hundred microamperes.

A load line CD is shown intersecting the family of curves and as is well known to those skilled in the art designates the manner in which the collector electrode current and voltage will vary in a particular circuit under the operating conditions illustrated. It now may be seen that if the bias conditions are such that the operating point E is at the intersection at the load line CD and the curve A, the collector electrode will offer a relatively high impedance to an external circuit and the collector electrode current will be relatively small. If, however, the bias conditions are such that the operating point has been shifted to point F at the intersection of the load line CD and the curve B, it is readily seen that the collector electrode will offer a relatively low impedance to an external circuit and that the collector electrode current will be relatively high. These characteristics of the collector electrode of a semiconductor device are effectively utilized in accordance with the present invention to control the effective shunt impedance appearing across a signal translating circuit.

Accordingly, the control voltage existing between the controls terminals 27 is controlled to vary the current flowing through the phase inverter transistor 30 and the two associated load resistors 31 and 33. The voltage drop appearing across each of the load resistors 31 and 33 is effective to control or alter the bias conditions on each of the transistors 10 and 11. When the bias conditions are such that the operating point of each of the transistors 10 and 11 is, for example, in the region of point F in Figure 5, each of the transistors will offer a relatively low impedance to the circuit. The total impedance which appears between the junction of the resistors 16 and 19 and signal ground will be one-half of the total impedance existing in each of the two parallel branches. The impedance of one of the parallel branches at signal frequencies is determined by the capacitance of the shunt capacitors 21 or 22 in series with the particular transistor. If the impedance offered by the transistor is high the resulting net impedance for the circuit will be high, and if the impedance offered by the transistor is low the resulting net impedance offered to the circuit will be low.

On the other hand, the direct current voltage which exists between signal ground and the junction of the two resistors 16 and 19 will remain constant over the entire control range. This may be seen by observing that when the transistors are biased for high current conduction the direct current voltage drop across each of the resistors 16 and 19 will be relatively high and when the two transistors are biased for low current conduction the direct current voltage drop appearing across each of the two resistors 16 and 19 is relatively low.

It is therefore seen that the shunt control circuit provided in accordance with the present invention is effective to alter the shunt impedance across a signal translating network while maintaining a constant direct current voltage across the network thus eliminating any possibility of transient disturbances or distortion.

Figure 2:
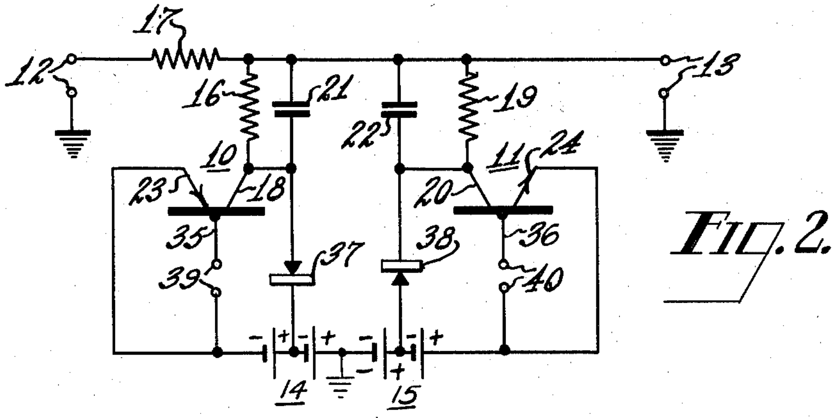
Figure 2 is a schematic circuit diagram of a shunt connected electronic control circuit illustrating a further embodiment of the invention shown in Figure 1.

The embodiment of the invention illustrated in Figure 2 is effective to provide control of the shunt impedance across a signal conveying network in the same manner as that above discussed in connection with Figure 1. A pair of diodes 37 and 38 are included in the circuit to provide limiting action and make an even lower impedance shunting available. The diode 37 is accordingly connected between the collector electrode 18 and a tap on the battery 14 and the diode 38 is connected between the collector electrode 20 and a tap on the battery 15. Control voltages may be applied to each of the transistors 10 and 11 from any convenient source which will provide push-pull signals to the control terminals 39 which appear between the base electrode 35 and the negative terminal of the battery 14 and the control terminals 40 which appear between the base electrode 36 and the positive terminal of the battery 15.

The operation of the embodiment illustrated in Figure 2 is essentially the same as that of the embodiment illustrated in Figure 1 except that the diodes limit the minimum direct current voltage drop which may be caused to exist across the signal translating network. When the diodes are limiting, they offer a low impedance to the signal currents and thus shunt the impedance of the transistor collector.

The embodiments of the invention shown in Figures 1 and 2 utilize the variable impedance characteristics of the collector electrode of a transistor to provide impedance control in a signal translating network. It is also possible to utilize the variable impedance of the base electrode of a semiconductor device which may be provided by varying a load element in the emitter electrode circuit.

Figure 3:
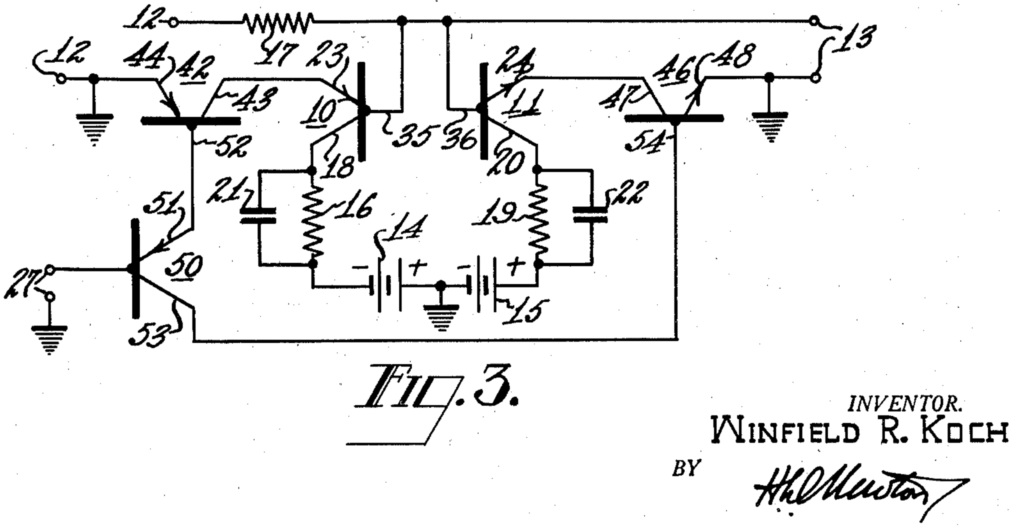
Figure 3 is a schematic circuit diagram of a shunt connected electronic control circuit illustrating the use of the variable base electrode impedance of semiconductor devices in accordance with the present invention.

An embodiment of the invention which effectively utilizes the variable base electrode impedance is illustrated in Figure 3 wherein the base electrodes 35 and 36 are connected in common to one terminal of the series resistor 17. A variable emitter electrode impedance element for the transistor 10 is shown as a PNP junction transistor 42 having a collector electrode 43 connected directly to the emitter electrode 25 and an emitter electrode 44 connected to the grounded one of the pair of input terminals 12.

In a similar manner a variable emitter electrode impedance element is shown as an NPN junction transistor 46 having a collector electrode 47 connected directly to the emitter electrode 24 and an emitter electrode 48 connected to the grounded one of the pair of output terminals 13. A push-pull control signal is provided for the two load transistors 42 and 46 by a phase inverter transistor 50 having an emitter electrode 51 connected to the base electrode 52 of the load transistor 42 and a collector electrode 53 connected to the base electrode 54 of the other load transistor 46. Control signals for effectively varying or controlling the bias applied to each of the load transistors 42 and 46 may be applied from any convenient source of control signal to a pair of control terminals 27.

Operating bias for the shunt transistor 10 is provided by the battery 14 which is connected in series with the collector electrode resistor 16 between the collector electrode 18 and signal ground. Operating bias for the transistor 11 is provided by the battery 15 connected in series with the collector load resistor 19 between the collector electrode 20 and signal ground. The collector electrode load resistor 16 may be bypassed at signal frequencies by a capacitor 21 connected in shunt therewith. In a like manner, the collector electrode load resistor 19 may be bypassed at signal frequencies by a capacitor 22.

It now may be seen that the load transistors 42 and 46 may be effectively controlled in the manner described in connection with Figure 1 to provide a variable impedance for the emitter electrode circuits of the transistors 10 and 11 respectively. Consequently, the impedance offered by the two transistors 10 and 11 to the external circuit will vary in accordance with the impedance variations provided by the load transsistors 42 and 46. When the control voltage which is applied to the pair of control terminals 27 is such as to provide a relatively high base electrode bias current for each of the load transistors 42 and 46, the impedance provided in the circuit by the transistors 10 and 11 will be low. If, on the other hand, the control signal is such as to provide a relatively small base electrode bias current for the load transistors 42 and 46, the impedance of each of the transistors 10 and 11 in the signal translating circuit will be relatively high.

Figure 4:
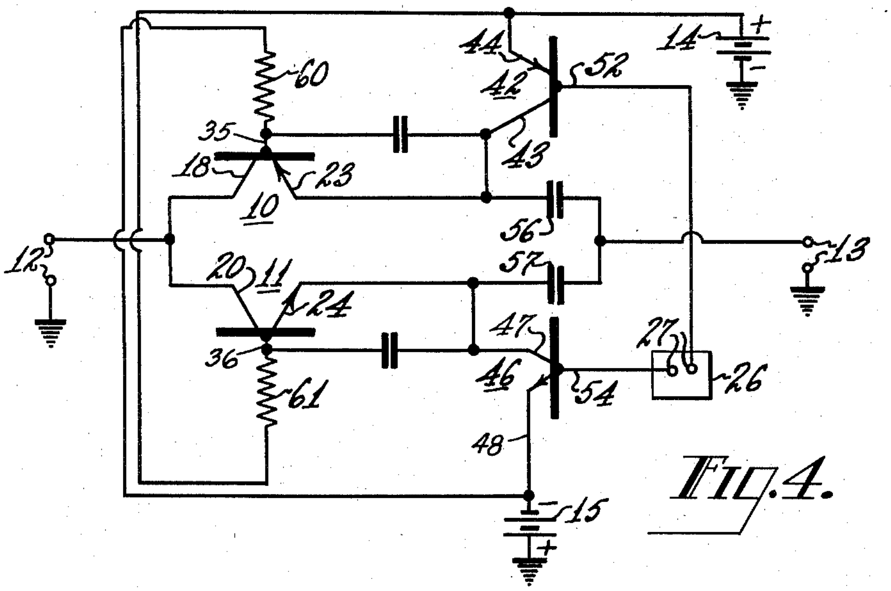
Figure 4 is a schematic circuit diagram of an electronic control circuit provided in accordance with the present invention and arranged in series in a signal conveying system.

It is therefore seen that the base electrode of a transistor may be used effectively to provide a remotely controllable variable impedance in a signal translating circuit. The embodiments of the invention illustrated in Figures 1, 2 and 3, as above discussed, are each adapted to provide an electronically controllable variable shunt impedance across a signal conveying network. It is also within the purview of the invention to provide an electronically controllable series impedance network in a signal conveying system as illustrated in Figure 4 wherein parallel path signal translation between the pair of input terminals 12 and the pair of output terminals 13 is provided by the transistors 10 and 11. Accordingly, the collector electrodes 18 and 20 are connected in common to one of the pair of input terminals 12 and the emitter electrodes 23 and 24 are respectively connected in series with a direct current blocking capacitor 56 and 57 to one of the pair of output terminals 13.

The first emitter electrode load transistor 42 is connected between the emitter electrode 25 and the positive terminal of the battery 14. The second emitter electrode load transistor 46 is connected between the emitter electrode 24 and the negative terminal of the battery 15. The base bias current for each of the transistors 10 and 11 is maintained substantially constant by means of a pair of base electrode resistors 60 and 61 which are connected respectively between the base electrode 35 and the negative terminal of the battery 15 and the base electrode 36 and the positive terminal of the battery 14. It is preferred that the resistance that each of the base bias resistors 60 and 61 be relatively large in order to provide an essentially constant current source to each of the base electrodes 35 and 36.

A control signal may be applied in push-pull relation between the base electrodes 52 and 54 from any convenient source connected to the pair of control terminals 27 which are illustrated as contained within the rectangle 26 illustrating generically a source of control signals.

The push-pull control signal which is applied between the base electrodes 52 and 54 will, as above discussed in connection with Figure 3, vary the impedance of the transistors 42 and 46 in the same sense. It is therefore seen that the impedance which will be offered to the circuit by the series transistors 10 and 11 will be varied as a result of the variation of the impedance of the transistors 42 and 46. As was above discussed in connection with Figure 1 however, the direct current voltage appearing across the input terminals 12 will remain unaltered by a variation in the impedance of the transistors 10 and 11. Accordingly, the efficiency of signal translation between the input terminals 12 and the output terminals 13 may be varied in accordance with the present invention without introducing distortion in the circuit.

Figure 6:
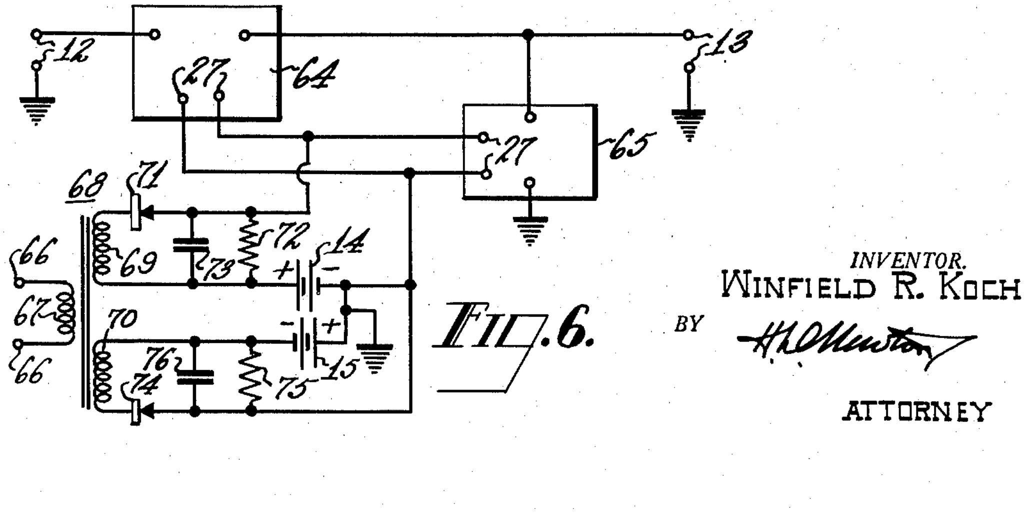
Figure 6 is a system diagram partly in block form illustrating the combination of a shunt and a series electronic control network provided in accordance with the present invention.

The system diagram illustrated in Figure 6 is a combination of an electronically controllable series impedance network and an electronically controllable shunt impedance network as provided in accordance with the present invention. The rectangle 64 represents a series controllable network which may be the network illustrated in Figure 4. The shunt connected network which may be any one of the networks illustrated in Figures 1 through 3 is shown as a rectangle 65.

Control voltages may be derived from any convenient alternating current signal source and applied to a pair of terminals 66 which are connected to the ends of a primary winding 67 of a coupling transformer 68. The coupling transformer 68 further includes a pair of secondary windings 69 and 70 which are utilized to provide a push-pull balanced signal for control of the variable impedance networks.

A direct current signal is derived from the secondary winding 69 by means of a unidirectionally conducting device, illustrated as a diode 71, connected in series with a load illustrated as the parallel combination of a load resistor 72 and a filter capacitor 73. One terminal of the secondary winding 69 is connected to signal ground through the battery 14 which provides energizing bias for the two controllable networks.

Direct current control voltages of an opposite sense are derived from the secondary winding 70 by means of a secondary unidirectionally conducting device, illustrated as a diode 74, connected in series with a load illustrated as a load resistor 75 and a filter capacitor 76 across the secondary winding 70. Operating bias of an opposite polarity is provided by the battery 15 which is connected between one terminal of the secondary winding 70 and signal ground.

One application for the system illustrated in Figure 6 may be to silence a radio receiving system when the telephone and piece of a conventional telephone instrument is lifted from the cradle. This may be accomplished by inserting the system of Figure 6 in series with the audio signal amplifier portion of a radio receiving system and providing a signal generator such as a radio frequency oscillator which may be turned on and off by the movement of the telephone hand piece. In this manner, when the telephone hand piece is lifted from the cradle, an RF signal is applied to the pair of terminals 66 which ultimately is converted to a push-pull direct current control voltage to provide a relatively high series impedance through the series network 64 and a relatively low shunt impedance through the shunt network 65 which results in a large reduction in the audio output of the receiving system without transient distortion.

Utilization of the control circuits provided in accordance with the present invention enables effective, efficient control of the impedance in shunt with or in series with a signal translating system with a minimum of circuit complexity and with a minimum of distortion. Transient distortion which might otherwise be introduced into the circuit is effectively eliminated.

What is claimed is:

1. A transistor control circuit comprising in combination, signal supply means, a pair of semiconductor devices of opposite conductivity types, a first source of energizing bias connected in series arrangement with one of said pair of semiconductor devices in shunt with said signal supply means, a second source of energizing bias connected in series arrangement with the other of said pair of semiconductor devices in shunt with said signal supply means, control means connected for simultaneously applying a control bias to each of said pair of devices in opposite sense to vary the conductivity of each in the same sense, and a common signal output circuit connected with said pair of semiconductor devices.

2. A transistor control circuit comprising in combination, a signal supply means, a pair of semiconductor devices of opposite conductivity types, a first source of energizing bias and a first direct current conductive element connected in series with one of said pair of semiconductor devices across said signal supply means, a second source of energizing bias and a second direct current conductive element connected in series with the other of said pair of semiconductor devices across said signal supply means, control means connected for simultaneously applying a control bias to each of said pair of devices in opposite sense to vary the conductivity of each in the same sense, and a common signal output circuit connected with said pair of semiconductor devices.

3. A transistor control circuit comprising in combination, a signal input circuit, a signal output circuit, a direct current conductive element connected between said input circuit and said output circuit, a pair of semiconductor devices of opposite conductivity types, a first source of energizing bias connected in series with one of said pair of semiconductor devices across said output circuit, a second source of energizing bias connected in series with the other of said pair of semiconductor devices across said output circuit, and control means connected for simultaneously applying a control bias to each of said pair of devices in opposite sense to vary the conductivity of each in the same sense.

4. In a signal conveying system, an electronically controllable variable impedance network connected for effectively controlling the efficiency of signal translation in said system and comprising in combination, a pair of semiconductor devices of opposite conductivity types, means connecting said devices in parallel in said system whereby signal currents in said system traverse each of said devices in parallel and are of the same magnitude, and control means connected with each of said devices for simultaneously applying control signals of opposite polarity to said pair of semiconductor devices whereby the impedance of each of said devices is varied in the same sense to effectively control the efficiency of signal translation in said system.

5. In a signal conveying system, an electronically controllable variable impedance network connected for effectively controlling the efficiency of signal translation in said system and comprising in combination, a pair of semiconductor devices of opposite conductivity types, a pair of direct current conductive impedance elements, each of said pair of direct current conductive elements being connected in series arrangement with one of said pair of semiconductor devices across said signal conveying system, and control means connected for simultaneously applying a control signal of opposite polarity to each of said devices.

6. In a signal conveying system, an electronically controllable variable impedance network connected for effectively controlling the efficiency of signal translation in said system and comprising in combination, a pair of input terminals, a pair of semiconductor devices of opposite conductivity types, each including input electrodes, a first direct current conductive impedance element connected between the collector electrode of one of said pair of semiconductor devices and one of said pair of input terminals, a second direct current conductive element connected between the collector electrode of the other of said pair of semiconductor devices and said one of said pair of input terminals, and control means connected for simultaneously applying control signals of opposite polarity to said input electrodes to vary the impedance of each said devices in the same sense.

7. In a signal conveying system, an electronically controllable variable impedance network connected for effectively controlling the efficiency of signal translation in said system and comprising in combination, a pair of semiconductor devices of opposite conductivity types, each including base, emitter and collector electrodes, a pair of direct current conductive impedance elements, each of said pair of direct current conductive elements being connected in series arrangement with emitter-collector electrode current path of one of said pair of semiconductor devices across said signal conveying system, and control means connected for applying a push-pull signal to said base electrodes to vary the impedance of each of said devices in the same sense.

8. In a signal conveying system, an electronically controllable variable impedance network connected for effectively controlling the efficiency of signal translation in said system and comprising in combination, a pair of semiconductor devices of opposite conductivity types, means connecting said devices in parallel in said system whereby signal currents of the same magnitude traverse each of said devices in parallel, and control means connected with each of said devices for simultaneously applying control signals of opposite polarity to said pair of semiconductor devices whereby the impedance of each of said devices is varied in the same sense to effectively control the efficiency of signal translation in said system.

9. In a signal conveying system, an electronically controllable variable impedance network connected for effectively controlling the efficiency of signal translation in said system and comprising in combination, a pair of semiconductor devices of opposite conductivity types, each including input, output and common electrodes, a first resistor and a first source of direct current bias connected in series with the common-output electrode path of one of said pair of semiconductor devices across said system, a second resistor and a second source of direct current bias connected in series with the common-output electrode path of the other of said pair of semiconductor devices across said system, capacitive means connected in shunt with each of said resistors, control means comprising a third resistor, a third semiconductor device and a fourth resistor connected in series in the order named between the common electrodes of said pair of semiconductor devices, and a source of control signal coupled with said third semiconductor device for providing a push-pull signal between the common and input electrodes of each of said pair of semiconductor devices for effectively controlling the shunt impedance in said system in accordance with the instantaneous magnitude of said control signal.

10. In a signal conveying system, an electronically controllable variable impedance network connected for effectively controlling the efficiency of signal translation in said system and comprising in combination, a pair of signal input terminals, a pair of signal output terminals, a pair of semiconductor devices of opposite conductivity types, each including input, output and common electrodes, a first capacitor connected in series with the common-output electrode path of one of said pair of devices between one of said pair of input terminals and one of said pair of output terminals, a second capacitor connected in series with the common-output electrode path of the other of said pair of devices between said one of said pair of input terminals and said one of said pair of output terminals, a first and a second transistor each having emitter, base and collector electrodes, a first source of energizing potential connected in series with the emitter-collector path of said first transistor between the common electrodes of said one of said pair of devices and a point of fixed reference potential, a second source of energizing potential connected in series with the emitter-collector electrode path of said second transistor between the common electrode of said other of said pair of devices and said point of fixed reference potential, bias means coupled between said sources of direct current energizing potential and the input eelctrodes of said pair of devices for providing a substantially constant current bias therefore, and a means coupled between the base electrodes of said first and second transistor for applying a push-pull signal to said transistors whereby the impedance of each of said pair of semiconductor devices is varied simultaneously in the same sense to effectively control the series impedance in said signal translating system.

11. In a signal conveying system, an electronically controllable variable impedance network connected for effectively controlling the efficiency of signal translation in said system and comprising in combination, a pair of signal input terminals, a pair of signal output terminals, a pair of semiconductor devices of opposite conductivity types, each including base, emitter and collector electrodes, a first capacitor connected in series with the emitter-collector electrode path of one of said pair of devices between one of said pair of input terminals and one of said pair of output terminals, a second capacitor connected in series with the emitter-collector electrode path of the other of said pair of devices between said one of said pair of input terminals and said one of said pair of output terminals, a first and a second transistor each having emitter, base and collector electrodes, a first source of energizing potential connected in series with the emitter-collector electrode path of said first transistor between the emitter electrode of said one of said pair of devices and a point of fixed reference potential, a second source of energizing potential connected in series with the emitter-collector electrode path of said second transistor between the emitter electrode of said other of said pair of devices and said point of fixed reference potential, bias means coupled between said source of direct current energizing potential and the base electrodes of said pair of devices for providing a substantially constant current bias therefore, and a means coupled between the base electrodes of said first and second transistor for applying a push-pull signal to said transistors whereby the impedance of each of said pair of semi-conductor devices is varied simultaneously in the same sense to effectively control the series impedance in said signal translating system.

12. In a signal conveying system, an electronically controllable variable impedance network connected for effectively controlling the efficiency of signal translation in said system and comprising in combination; a pair of semiconductor devices of opposite conductivity types, each including base, emitter and collector electrodes; a first resistor and a first source of direct current bias connected in series with the emitter-collector electrode path of one of said pair of semiconductor devices across said system; a second resistor and a second source of direct current bias connected in series with the emitter-collector electrode path of the other of said pair of semiconductor devices across said system; capacitive means connected in shunt with each of said resistors; control signal input means connected between each of said base electrodes and one of said sources direct current bias for simultaneously applying a control bias to each of said pair of devices in opposite sense to vary the conductivity of each in the same sense and a unilaterally conducting device connected between each of said collector electrodes and the associated source of direct current bias whereby the shunt impedance in said system is effectively controlled in accordance with the instantaneous magnitude a control signal applied to said control signal input means.

13. In a signal conveying system, an electronically controllable variable impedance network connected for effectively controlling the efficiency of signal translation in said system and comprising in combination; a pair of semiconductor devices of opposite conductivity types, each including base, emitter and collector electrodes; a first resistor and a first source of direct current bias connected in series with the base-collector electrode path of one of said pair of semi-conductor devices across said system; a second resistor and a second source of direct current bias connected in series with the base-collector electrode path of the other of said pair of semiconductor devices across said system; capacitive means connected in shunt with each of said resistors; control means comprising a first transistor and a second transistor connected in series between the emitter electrodes of said pair of semiconductor devices; and a source of control signal coupled with said first and second transistors for providing a push-pull signal for said pair of semiconductor devices to simultaneously vary the impedance of each of said pair of semiconductor devices in the same sense and to effectively control the shunt impedance in said system in accordance with the instantaneous magnitude of said control signal.

References Cited in the file of this patent

UNITED STATES PATENTS

| | | |
|---|---|---|
| 2,600,500 | Haynes et al. | June 17, 1952 |
| 2,666,818 | Shockley | Jan. 19, 1954 |
| 2,775,738 | Schlesinger | Dec. 25, 1956 |
| 2,782,267 | Beck | Feb. 19, 1957 |

OTHER REFERENCES

Electronics, March 1953, pp. 112, 113.

Symmetrical Properties of Transistors and Their Applications, G. C. Sziklai, Proceedings of the I. R. E., June 1953, pp. 717–719.